United States Patent [19]

Katagiri et al.

[11] Patent Number: 5,219,319

[45] Date of Patent: Jun. 15, 1993

[54] APPARATUS FOR REPLACING TOOL SETS OF POWDER MOLDING PRESS

[75] Inventors: Takeshi Katagiri, Machida; Masao Yamamoto, Kawasaki; Shiro Shirasaki, Yokohama, all of Japan

[73] Assignee: Yoshizuka Seiki Co., Ltd., Kanagawa, Japan

[21] Appl. No.: 806,338

[22] Filed: Dec. 13, 1991

[30] Foreign Application Priority Data

Dec. 28, 1990 [JP] Japan ................................. 2-415380

[51] Int. Cl.⁵ .............................................. B23Q 3/155
[52] U.S. Cl. ........................................ 483/28; 72/446; 425/78
[58] Field of Search ..................... 483/28, 29; 72/446, 72/442, 255, 263, 422; 425/345, 355, 452, 353, 78, 188; 100/229 R

[56] References Cited

U.S. PATENT DOCUMENTS

| | | | |
|---|---|---|---|
| 3,388,427 | 6/1968 | Smallbone | 425/345 |
| 3,599,467 | 8/1971 | Valks | 72/263 |
| 3,937,057 | 2/1976 | Trolle | 72/422 |
| 4,140,449 | 2/1979 | Takeshi et al. | 425/78 |
| 4,484,466 | 11/1984 | Groos | 72/255 |
| 4,880,373 | 11/1989 | Balogehl | 425/353 X |
| 4,901,427 | 2/1990 | Sakamoto et al. | 72/446 X |
| 4,968,468 | 11/1990 | Leinweber | 425/353 X |

FOREIGN PATENT DOCUMENTS

| | | | |
|---|---|---|---|
| 46-17558 | 7/1967 | Japan | 425/345 |
| 55-24399 | 2/1980 | Japan . | |
| 62-33039 | 2/1987 | Japan . | |
| 57730 | 3/1987 | Japan | 72/446 |
| 393126 | 1/1974 | U.S.S.R. | 72/446 |
| 1058695 | 12/1983 | U.S.S.R. | 72/446 |

Primary Examiner—William Briggs
Attorney, Agent, or Firm—Keck, Mahin & Cate

[57] ABSTRACT

An apparatus for replacing the tool sets without requiring any fixing or removal of the fluid pressure pipes such as hydraulic hoses or the like when the tool sets are fixed to or removed from the main body of the power molding press. Swing arms 6 having arm lengths set therein are oscillatably and rotatably fitted to the arm shafts 5 vertically installed at proper side locations of the main body 1 of the press in such a way as the rotating radius of the arm shafts may overlap the mounting position of the main body 1 of the press. The extreme ends of the swing arms 6 are provided with supporting boxes 7 on which the tool sets 3 are mounted. Rotation of the swing arms 6 enables the tool sets 3 to be moved toward or away from the centeral part of the main body 1 of the press and then the tool sets 3 to be fixed to or removed from the main body 1 of the press. The fluid pressure pipe passages for driving the tool sets 3 are connected in advance to the operating fluid pressure source at the main body 1 of the press near the aforesaid arm shafts 5 through the joint means following the rotation of the aforesaid swing arms 6.

1 Claim, 9 Drawing Sheets

APPARATUS FOR REPLACING TOOL SETS OF POWDER MOLDING PRESS

BACKGROUND OF THE INVENTION

1. Field of the Invention

This invention relates to an apparatus for replacing tool sets of powder molding press.

2. Description of the Prior Art

As an apparatus for replacing this kind of tool sets (die sets) in the prior art, for example, a system described in the gazette of Jap.Pat.Publn.No.Sho 55-24399 or Jap.Pat.Publn.No. Sho 62-33039 previously submitted by the present applicant or the like is well known.

In case of the apparatus for replacing the former tool sets, supporting boxes for use in fixing the tool sets are arranged at the extreme ends of the oscillating arms, the tool sets in the boxes are pushed into the press using hydraulic cylinders after oscillating the arms up to the frontal position of the main body of the press so as to enable the tool sets to be set in the main body of the press.

Further, in case of the apparatus for replacing the latter tool sets, transporting bogies for the tool sets are arranged along the parallel rails in such a way as they can freely run in a rightward or a leftward direction, the tool sets moved to the frontal end of the main body of the press by the transporting bogies are pushed into the main body of the press along the bolsters and then the tool sets can be installed at the main body of the press.

However, in the powder molding press machining work in recent years, there is provided a method for molding the final product or approximate final product and reducing a secondary machining work as much as possible due to a requirement of reducing the number of steps or a cost-down.

Due to this fact, a size of each of the tool sets is increased and thus a complex movement of the tool sets is controlled with a strong force applied by a hydraulic pressure or the like and as this controlling operation, servo-valves, proportional solenoid valves and digital valves or the like are used.

In this type of apparatus for replacing the tool sets in the prior art, the hydraulic hoses were removed at the coupler part during movement of the tool sets, the tool sets were set in the main body of the press and the hydraulic hoses placed near the main body of the press were connected to the tool sets by an one-touch coupler.

However, in case of the apparatus for replacing the prior art tool sets, the moving distance of the tool sets up to the center of the press was about 3 m to 6 m and further in case of a large-sized press, a large amount of driving fluid in it caused the hydraulic hoses to be elongated and thickened at its diameter, resulting in that the fixing or removing of the hydraulic hoses caused some troubles or interference against the operation and further a certain oil leakage occurred.

In addition, powders of raw material floating in the air or other dusts entered into the pipe passages when the coupler was removed and they caused a poor operation of the solenoid valves or other components.

In view of the foregoing, it is an object of the present invention to provide an apparatus for replacing the tool sets which does not require any fitting or removal of the fluid pressure pipes such as hydraulic hoses or the like when the tool sets are fitted to or removed from the main body of the press in order to resolve the aforesaid problems of the prior art.

It is also an object of the present invention to provide an apparatus for performing a smooth and easy fitting or removal of the tool sets to and way from the main body of the press.

It is also an object of the present invention to provide an apparatus for replacing the tool sets in which an oil leakage from the hydraulic hoses is effectively prevented.

It is a still further object of the present invention to provide an apparatus for replacing the tool sets in which the dusts are effectively prevented from entering into the pipe passages.

It is also an object of the present invention to provide an apparatus for replacing the tool sets of which operation is positively carried out.

Other objects and advantages of the present invention will become apparent from the following descriptions concerning the preferred embodiments in reference to the accompanying drawings.

SUMMARY OF THE INVENTION

A gist of the present invention consists in an apparatus for replacing the tool sets for a powder molding press in which the swing arms having their lengths set are fitted to the arm shafts vertically installed at appropriate locations at the sides of the main body of the press in such a way as a pivoting radius of the arm ends may overlap the set position of the main body of the press so as to be oscillatable, the extreme end of the swing arms are provided with the supporting boxes on which the tool sets are mounted, the tool sets can be moved between their original positions and the center of the main body of the press under a pivoting action of the swing arms and then the tool sets are fitted to and removed from the main body of the preset.

Another gist of the present invention consists in an apparatus for replacing the tool set for the aforesaid powder molding press in which the fluid pipe passages extending from the operating fluid source and the fluid pressure passages connected to the tool sets are coupled near the aforesaid arm shafts through the joint means following the rotating movement of the aforesaid swing arms.

DESCRIPTION OF THE PREFERRED EMBODIMENTS

Figure 1:
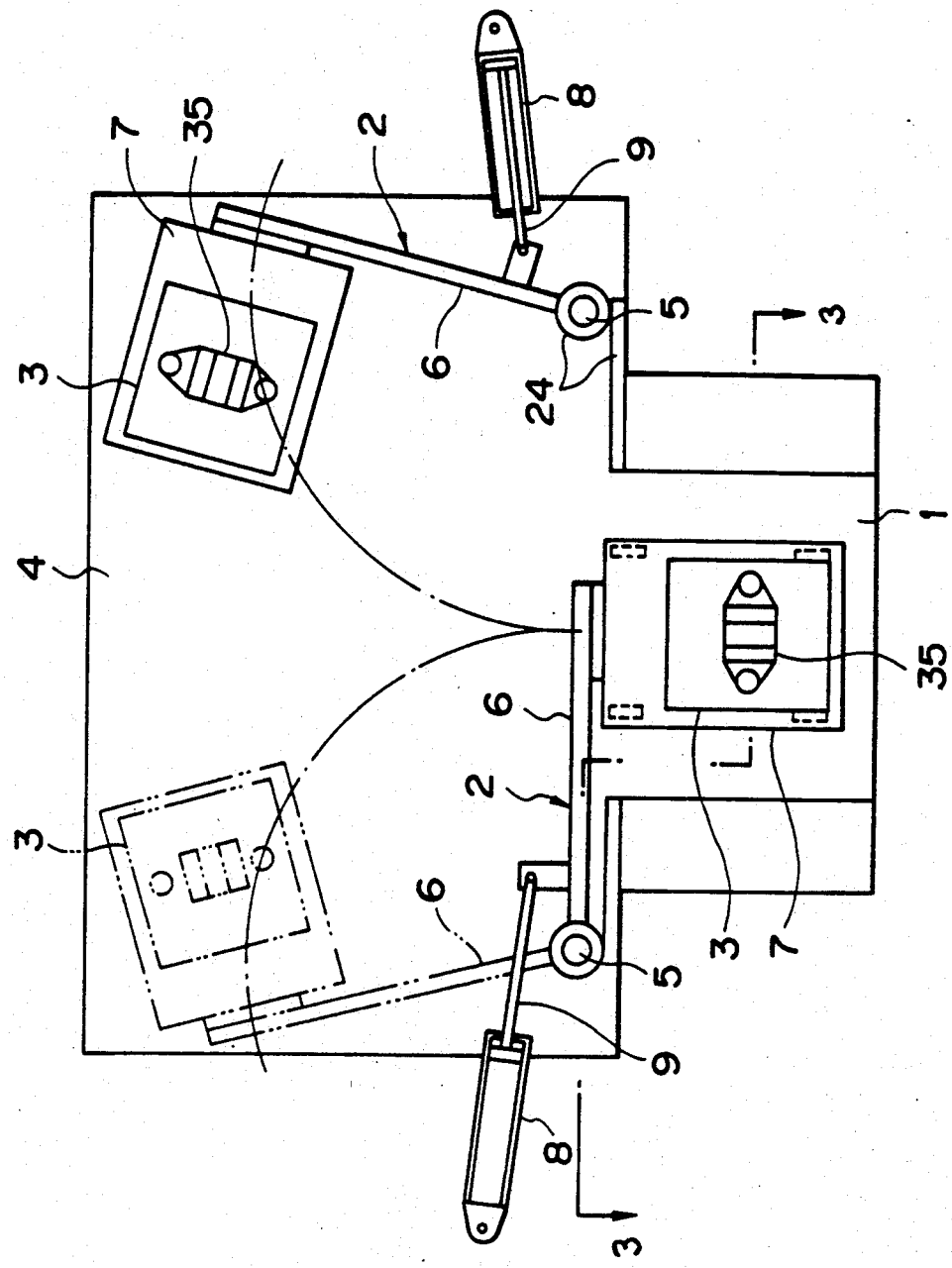
FIG. 1 is a top plan view for showing an apparatus for replacing the tool sets of the preferred embodiment of the present invention.

Referring now to the drawings, some preferred embodiments of the present invention will be described in detail. FIG. 1 is a top plan view for showing an apparatus for replacing the tool sets for a power molding press of the present invention.

In this figure, the rear part of the main body 1 of the press is provided with a moving table 4 acting as a moving surface for moving the tool sets 3 fixed to the swing loaders 2.

Figure 2:
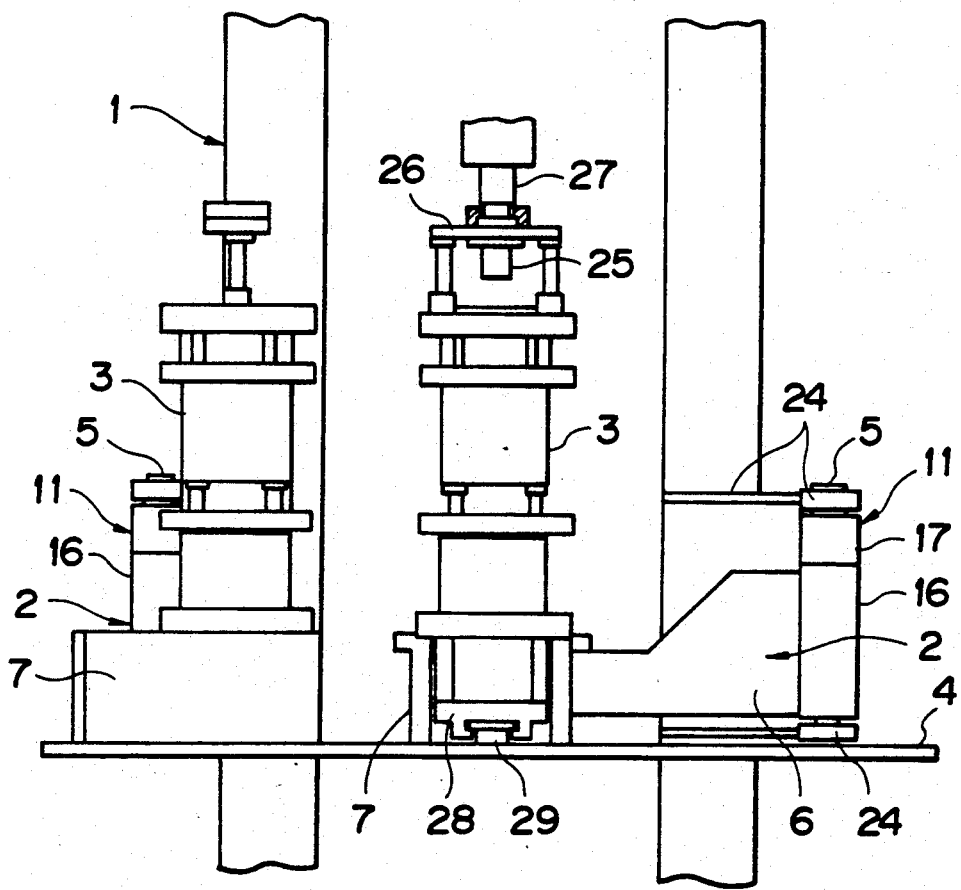
FIG. 2 is a rear view for showing an apparatus for replacing the aforesaid tool sets.
Figure 3:
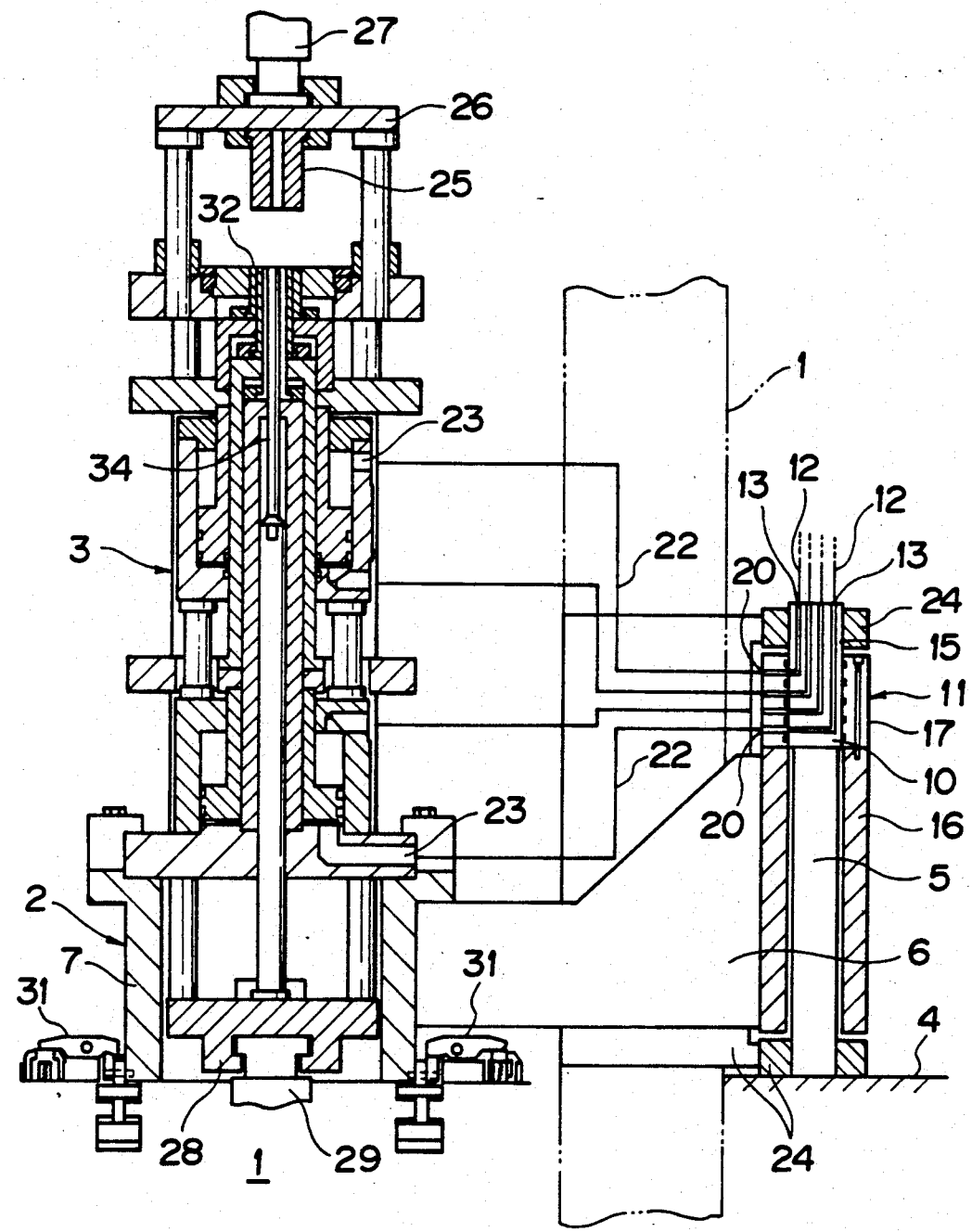
FIG. 3 is a sectional view taken along a line 3—3 of FIG. 1.

At the rear, right and left portions of the main body 1 of the press are vertically arranged the arm shafts 5 on the moving table 4. Each of the swing arms 6 and 6 is oscillatably fitted to these arm shafts 5, 5, respectively. As shown in FIGS. 2 and 3, to the extreme end of the arm 6 is fixed the supporting box 7. Tool sets 3, 3 are fixed to these supporting boxes 7, 7 by bolts. The swing loader 2 is composed of the oscillatable arm 6 and the supporting box 7. At the right and left side portions of the moving table 4 are attached the base ends of the hydraulic cylinders 8, 8 acting as the driving sources for the swing loaders 2, 2 in such a way as they may be oscillated. Extreme ends of the cylinders 9, 9 of these hydraulic cylinders 8, 8 are pivotally attached to the outer walls of the arms 6, 6.

Figure 4:
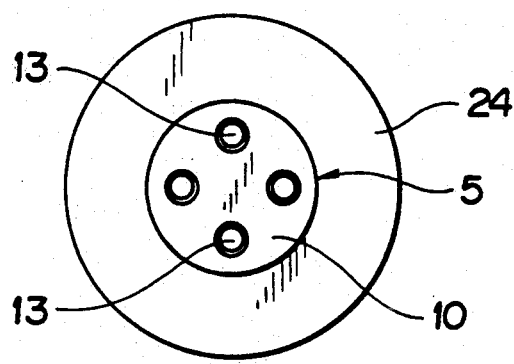
FIG. 4 is a top plan view for showing arm shafts.
Figure 5:
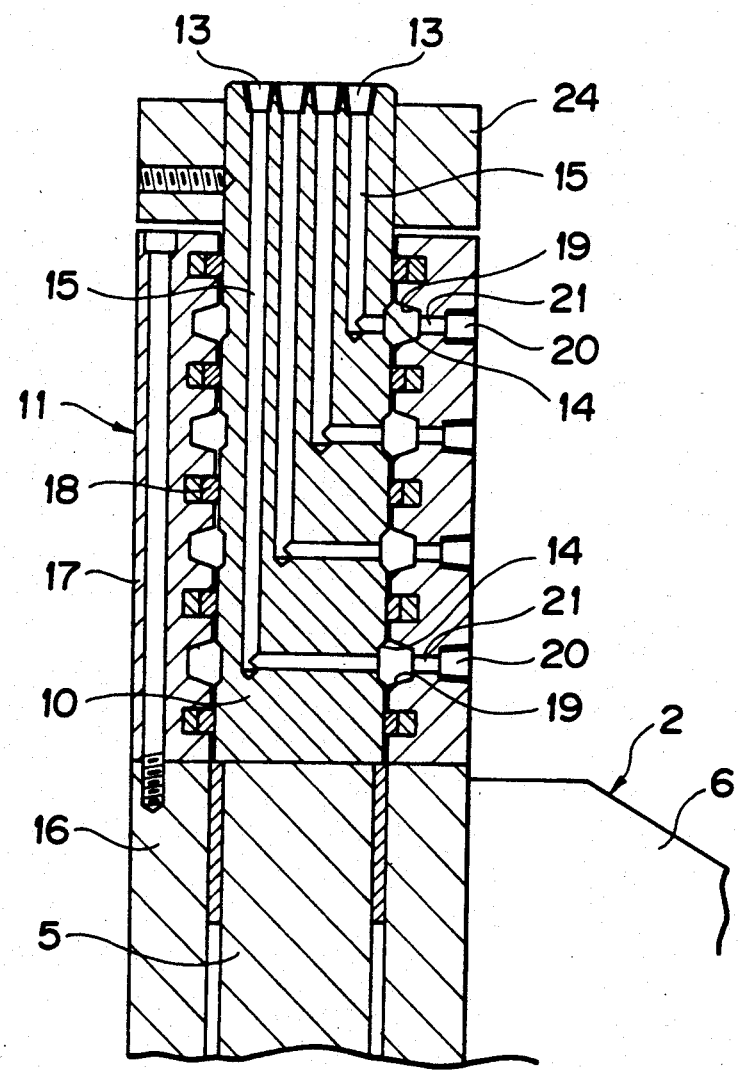
FIG. 5 is an enlarged longitudinal section for showing a substantial part of a rotary joint arranged in the arm shaft.

Then, a mechanism for arranging the fluid pressure pipes from the arm shafts to the tool sets 3 will be described. At the upper shaft part 10 of the arm shaft 5 is arranged a rotary joint 11 for use in connecting the outer fluid pressure source to the tool set 3 through the swing loader 2. As shown in FIGS. 4 and 5, at the upper surface of the shaft 10 are formed a plurality of connection ports 13 to which the fluid pressure pipe 12 extending from the outer fluid pressure source is connected. These ports 13 are connected to a plurality of outer peripheral grooves 14 formed at a circumference of the shaft 10 through inner communication holes 15.

To the upper part of the cylindrical holder 16 at the base part of the arm 6 axially fitted to the arm shaft 5 is fixed a cylindrical bracket 17 fitted to the upper shaft 10 by bolts. Oil sealing is provided by a packing 18 around the upper shaft 10, and a plurality of flow passage communication inner peripheral grooves 19 are formed at positions corresponding to the outer peripheral groove 14 of the shaft 10. Outer wall of the bracket 17 is formed with a plurality of connection ports 20 in its vertical direction, and these ports 20 are connected to the inner peripheral grooves 19 through communication holes 21. Fluid pressure pipes 22 connected to these connection ports 20 are connected to the connection ports 23 at the tool sets 3. In this case, if hydraulic pressure is applied as fluid pressure, the hydraulic pipes are used as the fluid pressure pipes 22. The upper end of the shaft 10 and the lower end of the arm shaft 5 are kept at their fixed states, respectively, by the bracket 24 fixed to the main body 1 of the press.

With such an arrangement as above, even if the swing loader 2 is rotated around the arm shaft 5, the fluid pressure pipes 12 extending from the fluid pressure source can be connected to the fluid pressure pipes 22 at the tool set 3 without any trouble through the rotary joint 11. The solenoid valves in the present invention are placed at the hydraulic source and although not shown, a faster response can be attained if the solenoid valves are placed near the hydraulic cylinders.

Then, an operation for moving the tool set 3 to a central position of the main body 1 of the press by the apparatus for replacing the tool set and installing it in the main body 1 of the press will be described.

At first, as shown in FIG. 1, the left side hydraulic cylinder 8, for example, is driven to cause the swing loader 2 to be rotated and then the tool set 3 having fluid pressure pipes 22 fixed therein is inserted into the central part of the main body 3 of the press. At this time, the fitted part of the upper punch 25 at the upper part of the holder 26 is fitted to the upper ram 27 of the main body 1 of the press, and the fitted part at the lower portion of the pulling-down plate 28 is fitted to the lower ram 29. When the tool set 3 is to be moved, weights of the supporting box 7 and the tool set 3 are received by the roller 30 at the lower surface of the supporting box 7.

Figure 6:
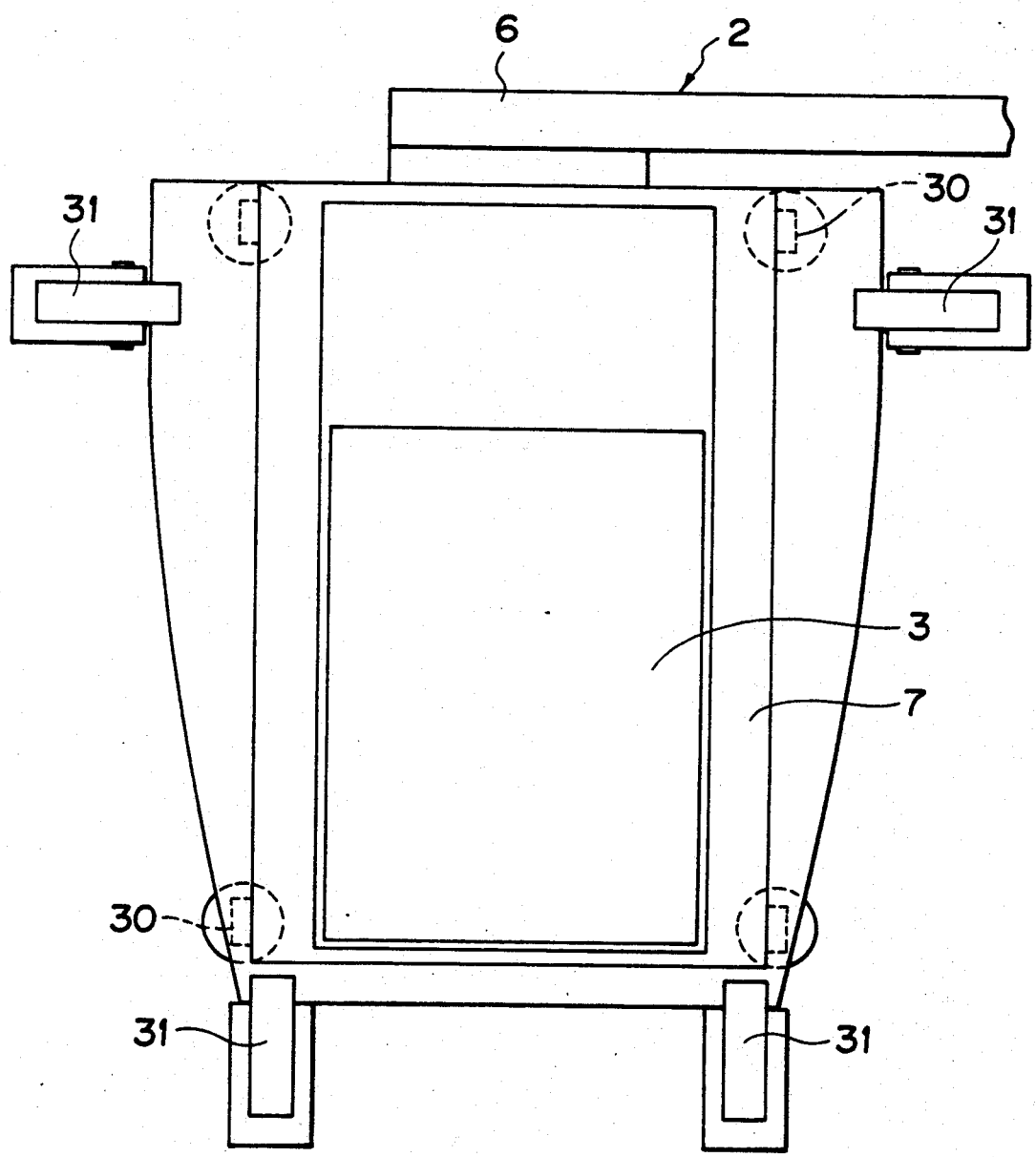
FIG. 6 is a top plan view for showing an enlarged tool set placed in the main body of the press.

As shown in FIG. 6, after the tool set 3 is installed at the main body 1 of the press, the tool set 3 for every supporting box 7 is clamped by hydraulic clamping units 31 arranged at the four corners of the main body 1 of the press.

When the aforesaid tool set 3 is to be moved, the clamping portion is kept at its unclamped state indicated at a right half part of FIG. 7, the roller surface of the roller 30 is in flush with the fixing upper surface 1a of the main body 1 of the press by the hydraulic cylinder 39 at the lifted position where the rod 39a of the hydraulic cylinder 39 arranged below the roller 30 is extended and at the same time the lower surface 2a of the swing loader 2 is lifted up so as to occupy a higher part than the fixing upper surface 1a of the main body 1 of the press and the swing loader 2 can be moved lightly and smoothly under a rotation of the roller 30.

Figure 7:
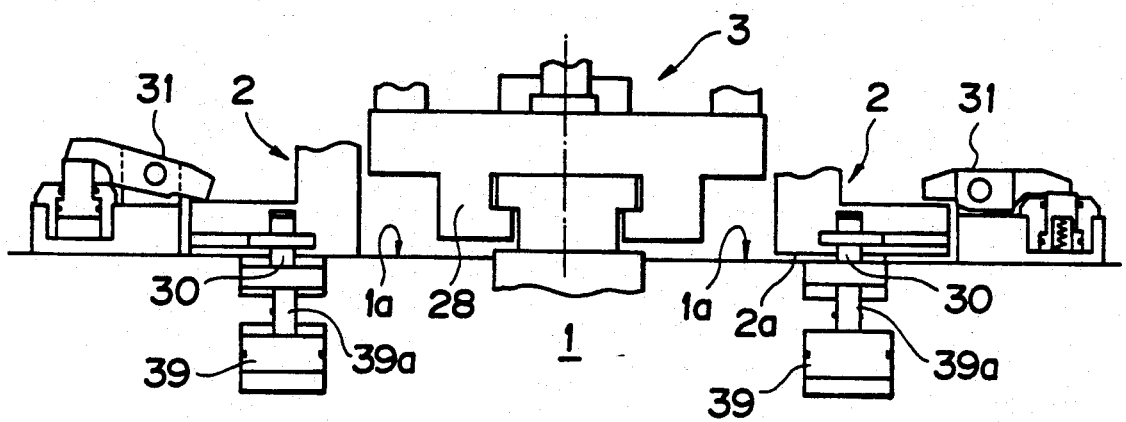
FIG. 7 is a longitudinal section for showing a clamped state set by a clamping unit and an unclamped state.

As the aforesaid tool set 3 is installed in the main body 1 of the press, it occupies the clamped state shown at the left half part of FIG. 7, and at this time hydraulic pressure in the hydraulic cylinder 39 is extracted to cause the rod 39a to be retracted and descended, the lower surface 2a of the swing loader 2 is abutted against the fixing upper surface 1a of the main body 1 of the press so as to accept the entire pressurizing force of the press.

After clamping the tool set 3 to the main body 1 of the press, the press is operated to perform a powder molding operation. This powder molding operation descends the upper punch 25 co-operating with the upper ram 27, pressurizes and molds the powder charged in a mold spacing formed by the dies 32, the lower punch 33 and the core rod 34 and at the same time after pressuring and molding operations, the product is pushed out by lifting up the upper punch 25 and the pulling down the dies 32 cooperated with the lower ram 29 and the core rod 34.

During operation of the press, another tool set 3 is fixed to the right swing loader 2 as viewed in FIG. 1 and a mold 35 is assembled to the tool set 3, thereafter a check is carried in advance under an operation of the simulator.

Upon completion of the pressing operation, the clamping units 31 are released and the tool set 3 is removed away from the main body 1 of the press and returned to its waiting position so as to replace the dies 35 and Perform its simulation.

At this time, the swingloader 2 at the right side is rotated by the hydraulic cylinder 8 and the other tool set 3 is mounted at the main body 1 of the press. After the tool set 3 is clamped at the main body 1 of the press, the powder molding operation is carried out in response to the operation similar to the operation described above.

Figure 8:
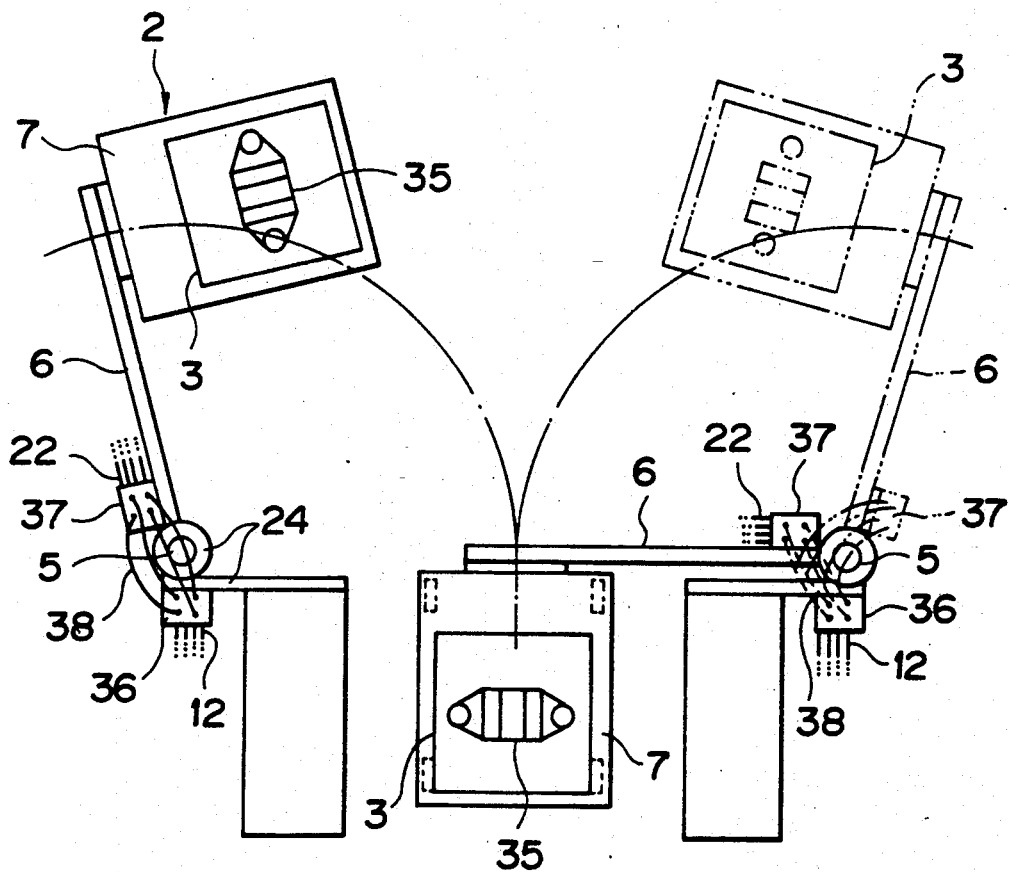
FIG. 8 is a top plan view for showing an apparatus for replacing the tool sets of another preferred embodiment.
Figure 9:
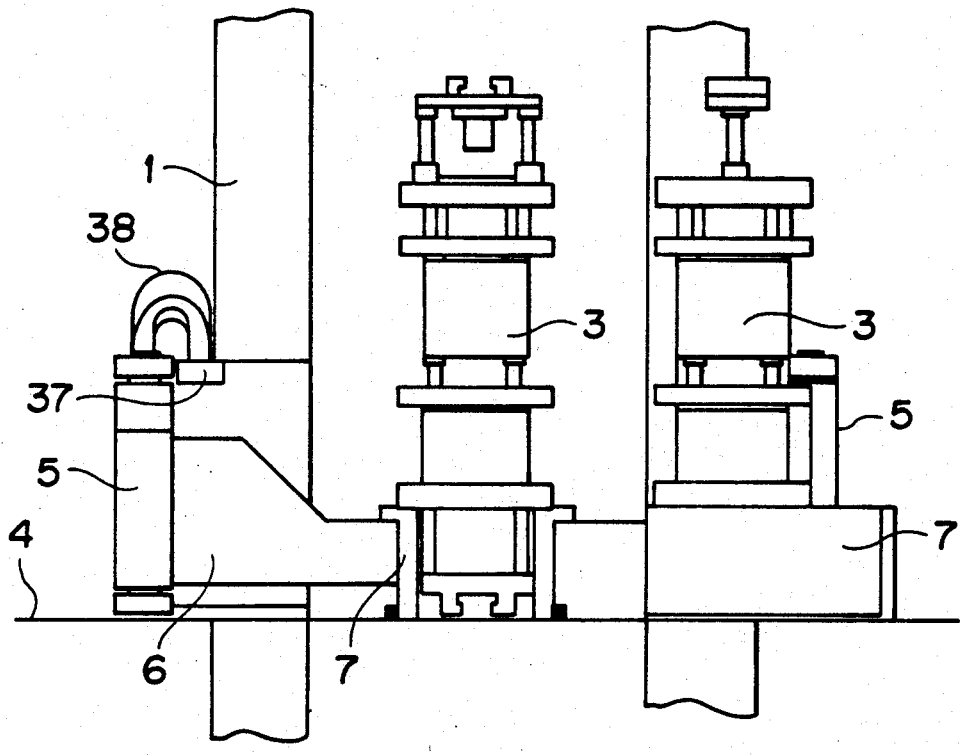
FIG. 9 is a rear view for showing an apparatus for replacing the tool sets of another preferred embodiment.
Figure 10:
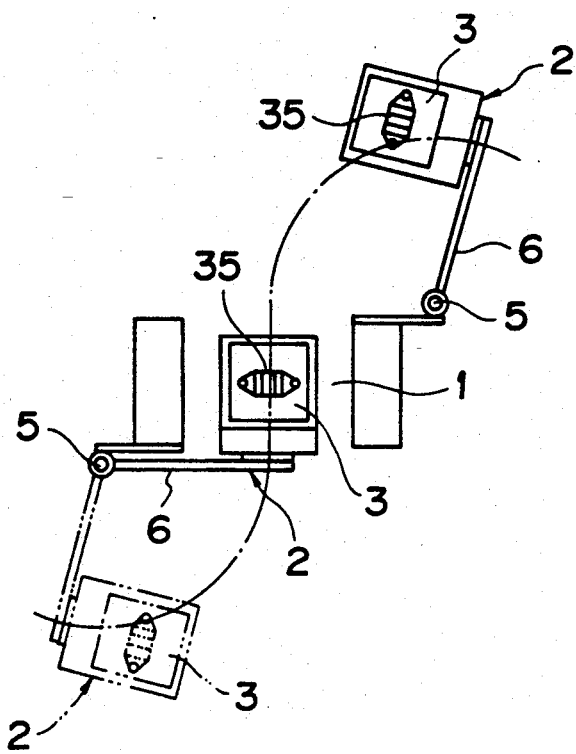
FIG. 10 is a top plan view for showing an apparatus for replacing the tool sets of a still further preferred embodiment.
Figure 11:
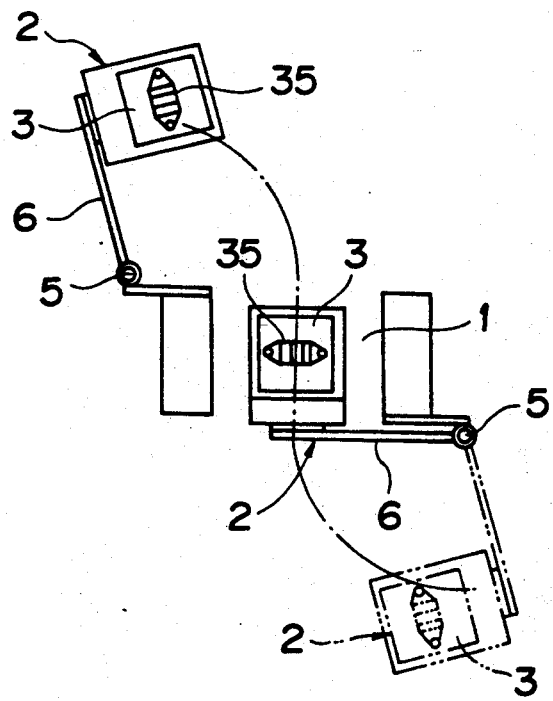
FIG. 11 is a top plan view for showing an apparatus for replacing the tool sets of a yet still further preferred embodiment.

Then, another preferred embodiment shown in FIGS. 8 and 9 will be described. In this preferred embodiment, the rotary joint 11 is not provided at the part of the arm shaft 5, but each of the fixing pipe blocks 36 to which the fluid pressure pipes 12 extending from the fluid pressure source are connected and movable pipe blocks 37 fixed to the base part of the arm 6 is arranged at part near the arm shaft 5, and at the same time the fixing pipe blocks 36 and the movable pipe blocks 37 are connected by the flexible fluid pressure hoses 38. The movable pipe blocks 37 and the tool sets 3 are connected by the fluid pressure pipes 22.

In this way, since the fluid pressure source and the tool sets 3 are connected at an approaching distance near the arm shafts 5 using the fluid pressure hoses 38, the movement of this part is quite a few even if the swing loaders 2 are rotated, the fluid pressure hoses 38 are freely bent and then the working fluid pressure from the fluid pressure source can be transmitted without trouble to the tool sets 3.

Then, still further preferred embodiments of the present invention shown in FIGS. 10 to 13 will be described. At first, in case of the preferred embodiment shown in FIGS. 10 and 11, each of the swing loaders 2, 2 is arranged at the front and rear diagonal positions of the main body 1 of the press, respectively.

Figure 12:
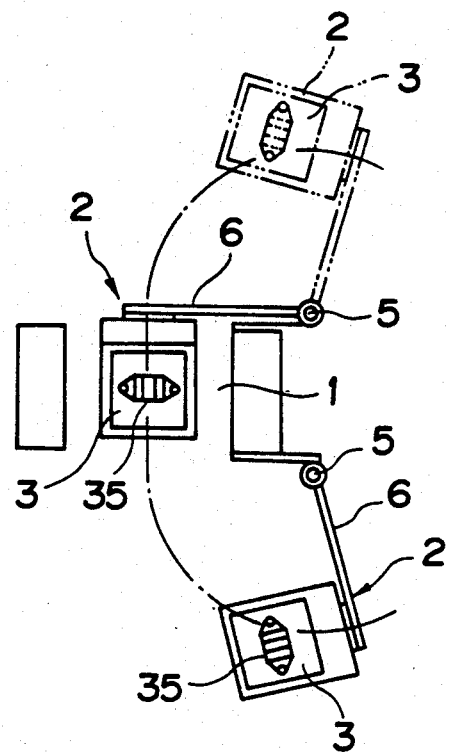
FIG. 12 is a top plan view for showing an apparatus for replacing the tool sets of a yet still further preferred embodiment.
Figure 13:
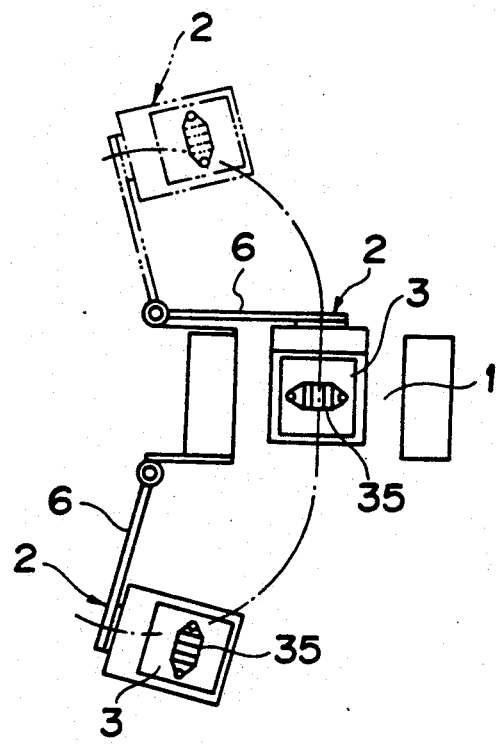
FIG. 13 is a top plan view for showing an apparatus for replacing the tool sets of a yet still further preferred embodiment.

In case of the preferred embodiments shown in FIGS. 12 and 13, each of the swing loaders 2, 2 is placed in front of and at a rear part of the main body 1 of the press, and each of the swing loaders 2, 2 is arranged at either the right side or the left side of the main body of the press.

The swing loaders 2, 2 may be oppositely at the front right and left sides of the main body 1 of the press.

As apparent from the aforesaid preferred embodiments, in the present invention, the tool sets mounted at the supporting boxes arranged at the extreme ends of the swing arms can be moved to the central position of the main body of the press under an oscillating movement of the swing arms, fixed or removed and replaced, so that the tool sets can be fixed to or removed from the the main body of the press while the fluid pressure hoses being connected in advance to the tool sets and then a working efficiency can be improved.

Further, since the fluid pressure hoses are not fixed to or removed from the main body of the press, there is no possibility that the raw material powder floating in the air or other dusts also floating in the air enter into the pipe passages to cause the solenoid valves or other parts to be poor in their operation.

In addition, since the fluid pressure pipe passages for driving the tool sets are connected in advance to the fluid pressure source at the main body of the press near the arm shafts through the joint means following to the rotation of the swing arms, no long fluid pressure hoses are required and no trouble occur during the operation of the apparatus.

The aforesaid description related to the preferred embodiments is only for a sake of description and various modifications and applications can be applied and so the present invention is limited only by the description of the claims as follows.

What is claimed is:

1. An apparatus for replacing tool sets for a powder molding press comprising arm shafts secured on opposite sides of a main body of a press, swing arms pivotably fitted to said arm shafts; wherein lengths of said swing arms are selected whereby a rotating radius of outer ends of the swing arms overlaps a mounting position of the main body of the press; and outer ends of said swing arms are provided with supporting boxes for mounting tool sets; mounted tool sets being movable toward and away from a central part of the main body of the press during rotation of said swing arms, wherein the tool sets are moved to or removed from the main body of the press, and wherein fluid pressure passage pipes extending from an operating fluid pressure source and a fluid pressure pipe passage connected to the tool sets are connected at a location near to said arm shafts through rotary joint means following the pivoted rotation of said swing arms.

* * * * *